United States Patent
Sahlin et al.

(10) Patent No.: US 11,324,023 B2
(45) Date of Patent: May 3, 2022

(54) CONFIGURATION OF UPLINK TRANSMISSION FOR A WIRELESS DEVICE

(71) Applicant: Telefonaktiebolaget LM Ericsson (publ), Stockholm (SE)

(72) Inventors: Henrik Sahlin, Mölnlycke (SE); Jingya Li, Gothenburg (SE); Gustav Wikström, Täby (SE); Niklas Andgart, Södra Sandby (SE); Laetitia Falconetti, Järfälla (SE); Daniel Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 273 days.

(21) Appl. No.: 15/543,731

(22) PCT Filed: May 12, 2017

(86) PCT No.: PCT/SE2017/050492
§ 371 (c)(1),
(2) Date: Jul. 14, 2017

(87) PCT Pub. No.: WO2017/196250
PCT Pub. Date: Nov. 16, 2017

(65) Prior Publication Data
US 2018/0242347 A1    Aug. 23, 2018

Related U.S. Application Data

(60) Provisional application No. 62/335,763, filed on May 13, 2016.

(51) Int. Cl.
*H04W 72/12* (2009.01)
*H04W 72/14* (2009.01)
*H04W 72/04* (2009.01)

(52) U.S. Cl.
CPC ..... *H04W 72/1268* (2013.01); *H04W 72/042* (2013.01); *H04W 72/0446* (2013.01); *H04W 72/14* (2013.01)

(58) Field of Classification Search
CPC .......... H04W 72/1268; H04W 72/042; H04W 72/0446; H04W 72/14
See application file for complete search history.

(56) References Cited

U.S. PATENT DOCUMENTS 8,797,867 B1 * 8/2014 Chen .................. H04L 41/5022
370/232
2015/0333898 A1   11/2015 Ji et al.
(Continued)

FOREIGN PATENT DOCUMENTS

WO    2016040290 A1    3/2016
WO    2016142006 A1    9/2016
(Continued)

OTHER PUBLICATIONS

Author Unknown, "Technical Specification Group Radio Access Network; Evolved Universal Terrestrial Radio Access (E-UTRA); Study on latency reduction techniques for LTE (Release 13)," Technical Report 36.881, Version 0.6.0, 3GPP Organizational Partners, Feb. 2016, 92 pages.
(Continued)

*Primary Examiner* — Mohamed A Kamara
(74) *Attorney, Agent, or Firm* — Withrow & Terranova, PLLC

(57) ABSTRACT

There is provided mechanisms for providing configuration for uplink transmission to a wireless device. A method is performed by a network node. The method comprises transmitting a message comprising configuration for uplink transmission with short TTI operation. The method comprises
(Continued)

transmitting a fast grant comprising scheduling of an uplink short TTI for the wireless device.

27 Claims, 13 Drawing Sheets

(56) References Cited

U.S. PATENT DOCUMENTS

| | | | |
|---|---|---|---|
| 2015/0334685 | A1 | 11/2015 | Ji et al. |
| 2016/0128095 | A1* | 5/2016 | Damnjanovic ....... H04L 1/1812 370/336 |
| 2017/0290008 | A1* | 10/2017 | Tooher .................. H04L 1/0007 |
| 2018/0042013 | A1* | 2/2018 | Byun ...................... H04J 11/00 |
| 2018/0192434 | A1* | 7/2018 | Lee ........................... H04L 5/00 |

FOREIGN PATENT DOCUMENTS

| | | |
|---|---|---|
| WO | 2016142132 A1 | 9/2016 |
| WO | 2016142136 A1 | 9/2016 |
| WO | 2017008840 A1 | 1/2017 |
| WO | 2017030484 A1 | 2/2017 |
| WO | 2017078595 A1 | 5/2017 |

OTHER PUBLICATIONS

Author Unknown, "Technical Specification Group Radio Access Network; Evolved Universal Terrestrial Radio Access (E-UTRA); Study on latency reduction techniques for LTE (Release 13)," Technical Report 36.881, Version 0.7.0, 3GPP Organizational Partners, Apr. 2016, 183 pages.

Author Unknown, "Technical Specification Group Radio Access Network; Evolved Universal Terrestrial Radio Access (E-UTRA); Study on latency reduction techniques for LTE (Release 14)," Technical Report 36.881, Version 14.0.0, 3GPP Organizational Partners, Jun. 2016, 249 pages.

Author Unknown, "Technical Specification Group Radio Access Network; Evolved Universal Terrestrial Radio Access (E-UTRA); Multiplexing and channel coding (Release 13)," Technical Specification 36.212, Version 13.1.0, 3GPP Organizational Partners, Mar. 2016, 129 pages.

Ericsson, "R1-163323: Definition of DCI bit fields for short TTI," 3rd Generation Partnership Project (3GPP), TSG RAN WG1 Meeting #84bis, Apr. 11-15, 2016, 5 pages, Busan.

Ericsson, "R1-165293: sPDCCH search space design," 3rd Generation Partnership Project (3GPP), TSG-RAN WG1 #85, May 23-27, 2016, 6 pages, Nanjing, P R. China.

Ericsson, "R1-165294: DCI for sTTI scheduling," 3rd Generation Partnership Project (3GPP), TSG-RAN WG1 #85, May 23-27, 2016, 5 pages, Nanjing, P R. China.

Ericsson, "R1-165296: Physical design aspects of sPUSCH," 3rd Generation Partnership Project (3GPP), TSG-RAN WG1 #85, May 23-27, 2016, 6 pages, Nanjing, P R. China.

Mediatek Inc., "R1-162943: System-level performance evaluation for TCP throughput enhancement with dynamic TTI tuning," 3rd Generation Partnership Project (3GPP), TSG RAN WG1 Meeting #84 bis, Apr. 11-15, 2016, 11 pages, Busan, KR.

Ericsson, "R1-163320: Physical layer aspects for PUSCH for short TTI," 3rd Generation Partnership Project (3GPP), TSG RAN WG1 Meeting #84 bis, Apr. 11-15, 2016, 3 pages, Busan, South Korea.

Nokia et al., "R1-162788: Details of Shorter TTI operation for Latency Reduction," 3rd Generation Partnership Project (3GPP), TSG-RAN WG1 Meeting #84bis, Apr. 11-15, 2016, 5 pages, Busan, South Korea.

International Search Report and Written Opinion for International Patent Application No. PCT/SE2017/050492, dated Aug. 24, 2017, 16 pages.

Ericsson, "R1-163322: Downlink control signaling design for short TTI," 3GPP TSG RAN WG1 Meeting #84bis, Apr. 11-15, 2016, Busan, 4 pages.

Ericsson, "R2-154740: Study of shorter TTI for latency reduction," 3GPP TSG-RAN WG2 #91 bis, Oct. 5-9, 2015, Malmö, Sweden, 8 pages.

Lenovo, "R1-162739: Design of UL channels for shortened TTI," 3GPP TSG RAN WG1 Meeting #84b, Apr. 11-15, 2016, Busan, Korea, 4 pages.

Notice of Reasons for Rejection for Japanese Patent Application No. 2018-559841, dated Dec. 24, 2019, 8 pages.

Examination Report for European Patent Application No. 17726721,8, dated Sep. 28, 2020, 10 pages.

* cited by examiner

CONFIGURATION OF UPLINK TRANSMISSION FOR A WIRELESS DEVICE

This application is a 35 U.S.C. § 371 national phase filing of International Application No. PCT/SE2017/050492, filed May 12, 2017, which claims the benefit of U.S. Provisional Application No. 62/335,763, filed May 13, 2016, the disclosures of which are incorporated herein by reference in their entireties.

TECHNICAL FIELD

Embodiments presented herein relate to a method, a network node, a, computer program, and a computer program product for providing configuration for uplink transmission to a wireless device. Embodiments presented herein further relate to a method, a wireless device, a, computer program, and a computer program product for configuration for uplink transmission from a network node.

BACKGROUND

One parameter in providing good performance and capacity for a given communications protocol in a communications network is packet data latency. Latency measurements can be performed in all stages of the communications network, for example when verifying a new software release or system component, and/or when deploying the communications network and when the communications network is in commercial operation.

Shorter latency than previous generations of 3GPP radio access technologies was one performance metric that guided the design of Long Term Evolution (LTE). LTE is also now recognized by the end-users to be a system that provides faster access to internet and lower packet latencies than previous generations of mobile radio technologies.

Packet latency is also a parameter that indirectly influences the throughput of the communications network. Traffic using the Hypertext Transfer Protocol (HTTP) and/or the Transmission Control Protocol (TCP) is currently one of the dominating application and transport layer protocol suite used on the Internet. The typical size of HTTP based transactions over the Internet is in the range of a few tens of kilobytes up to one megabyte. In this size range, the TCP slow start period is a significant part of the total transport period of the packet stream. During TCP slow start the performance is packet latency limited. Hence, improved packet latency can potentially improve the average throughput, at least for this type of TCP based data transactions.

Radio resource efficiency could also be positively impacted by packet latency reductions. Lower packet data latency could increase the number of transmissions possible within a certain delay bound; hence higher Block Error Rate (BLER) targets could be used for the data transmissions freeing up radio resources potentially improving the capacity of the system.

The existing physical layer downlink control channels, Physical Downlink Control Channel (PDCCH) and enhanced PDCCH (ePDCCH), are used to carry Downlink Control Information (DCI) such as scheduling decisions for uplink (UL; from device to network) and downlink (DL; from network to device) and power control commands. Both PDCCH and ePDCCH are according to present communications networks transmitted once per 1 ms subframe.

3GPP TS 36.212 lists examples of different (DCI) formats for uplink (UL) and downlink (DL) resource assignments. UL scheduling grants use either DCI format 0 or DCI format 4. The latter was added in the 3rd Generation Partnership Project (3GPP) Release 10 (Rel-10) for supporting uplink spatial multiplexing The existing way of operation, e.g. frame structure and control signalling, are designed for data allocations in subframes of a fixed length of 1 ms, which may vary only in allocated bandwidth. Specifically, the current DCIs define resource allocations within the entire subframe, and are only transmitted once per subframe. The existing way of operation does not indicate how scheduling of UL and DL data can be performed in short subframes, i.e., subframes shorter than 1 ms.

Hence, there is a need for efficient communications using short subframes.

SUMMARY

An object of embodiments herein is to provide mechanisms for communications using short subframe.

According to a first aspect there is presented a method for providing configuration for uplink transmission to a wireless device. The method is performed by a network node. The method comprises transmitting a message comprising configuration for uplink transmission with short TTI operation. The method comprises transmitting a fast grant comprising scheduling of an uplink short TTI transmission for the wireless device.

According to a second aspect there is presented a network node for providing configuration for uplink transmission to a wireless device. The network node comprises processing circuitry. The processing circuitry is configured to cause the network node to transmit a message comprising configuration for uplink transmission with short TTI operation. The processing circuitry is configured to cause the network node to transmit a fast grant comprising scheduling of an uplink short TTI transmission for the wireless device.

According to a third aspect there is presented a network node for providing configuration for uplink transmission to a wireless device. The network node comprises processing circuitry and a computer program product. The computer program product stores instructions that, when executed by the processing circuitry, causes the network node to perform steps, or operations. The steps, or operations, cause the network node to transmit a message comprising configuration for uplink transmission with TTI operation. The steps, or operations, cause the network node to transmit a fast grant comprising scheduling of an uplink short TTI transmission for the wireless device.

According to a fourth aspect there is presented a network node for providing configuration for uplink transmission to a wireless device. The network node comprises a transmit module configured to transmit a message comprising configuration for uplink transmission with short TTI operation. The network node comprises a transmit module configured to transmit a fast grant comprising scheduling of an uplink short TTI transmission for the wireless device.

According to a fifth aspect there is presented a computer program for providing configuration for uplink transmission to a wireless device, the computer program comprising computer program code which, when run on processing circuitry of a network node, causes the network node to perform a method according to the first aspect.

According to a sixth aspect there is presented a method for receiving configuration for uplink transmission from a network node. The method is performed by a wireless device. The method comprises receiving, from the network node, a message comprising configuration for uplink transmission with short TTI operation. The method comprises receiving, from the network node, a fast grant comprising scheduling of an uplink short TTI transmission for the wireless device.

According to a seventh aspect there is presented a wireless device for receiving configuration for uplink transmission from a network node. The wireless device comprises processing circuitry. The processing circuitry is configured to cause the wireless device to receive, from the network node, a message comprising configuration for uplink transmission with short TTI operation. The processing circuitry is configured to cause the wireless device to receive, from the network node, a fast grant comprising scheduling of an uplink short TTI transmission for the wireless device.

According to an eighth aspect there is presented a wireless device for receiving configuration for uplink transmission from a network node. The wireless device comprises processing circuitry and a computer program product. The computer program product stores instructions that, when executed by the processing circuitry, causes the wireless device to perform steps, or operations. The steps, or operations, cause the wireless device to receive, from the network node, a message comprising configuration for uplink transmission with short TTI operation. The steps, or operations, cause the wireless device to receive, from the network node, a fast grant comprising scheduling of an uplink short TTI transmission for the wireless device.

According to a ninth aspect there is presented a wireless device for receiving configuration for uplink transmission from a network node. The wireless device comprises a receive module configured to receive, from the network node, a message comprising configuration for uplink transmission with short TTI operation. The wireless device comprises a receive module configured to receive, from the network node, a fast grant comprising scheduling of an uplink short TTI transmission for the wireless device.

According to a tenth aspect there is presented a computer program for receiving configuration for uplink transmission from a network node, the computer program comprising computer program code which, when run on processing circuitry of a wireless device, causes the wireless device to perform a method according to the sixth aspect.

According to an eleventh aspect there is presented a computer program product comprising a computer program according to at least one of the fifth aspect and the tenth aspect and a computer-readable storage medium on which the computer program is stored. The computer readable storage medium can be a non-transitory computer readable storage medium.

Advantageously these methods, these network nodes, these wireless devices, and these computer programs provides efficient communications using short subframe Advantageously this improves the resource utilization for uplink short TTI transmissions.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, on which:

FIGS. 6-14 schematically illustrate short TTI configurations in a subframe according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
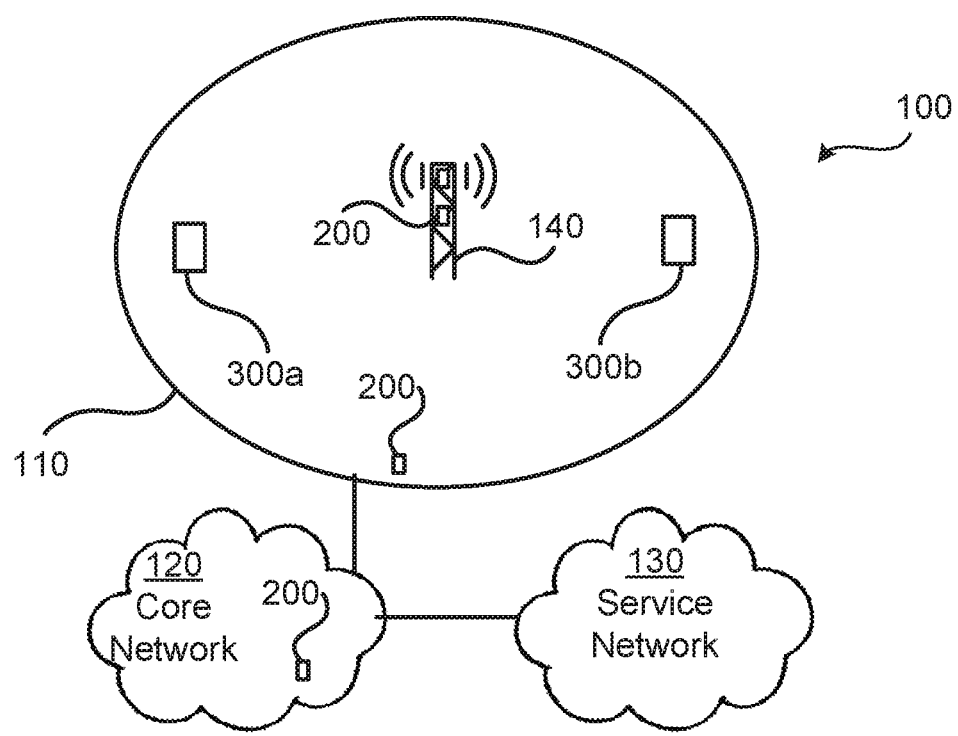
FIG. 1 is a schematic diagram illustrating a communication network according to embodiments.

FIG. 1 is a schematic diagram illustrating a communications network 100 where embodiments presented herein can be applied. The communications network 100 comprises at least one network node 200. The functionality of the network node 200 and how it interacts with other entities, nodes, and devices in the communications network 100 will be further disclosed below.

The communications network 100 further comprises at least one radio access network node 140. The at least one radio access network node 140 is part of a radio access network 110 and operatively connected to a core network 120 which in turn is operatively connected to a service network 130. The at least one radio access network node 140 provides network access in the radio access network 110. A wireless device 300a, 300b served by the at least one radio access network node 140 is thereby enabled to access services and exchange data with the core network 120 and the service network 130.

Examples of wireless devices 300a, 300b include, but are not limited to, mobile stations, mobile phones, handsets, wireless local loop phones, user equipment (UE), smartphones, laptop computers, tablet computers, network equipped sensors, wireless modems, and Internet of Things devices. Examples of radio access network nodes 120 include, but are not limited to, radio base stations, base transceiver stations, NodeBs, evolved NodeBs, access points, and access nodes. As the skilled person understands, the communications network 100 may comprise a plurality of radio access network nodes 120, each providing network access to a plurality of wireless devices 300a, 300b. The herein disclosed embodiments are no limited to any particular number of network nodes 200, radio access network nodes 120 or wireless devices 300a, 300b.

The wireless device 300a, 300b accesses services and exchanges data with the core network 120 and the service network 130 by transmitting data in packets to the core network 120 and the service network 130 and by receiving data in packets from the core network 120 and the service network 130 via the radio access network node 140.

Packet latency has above been identified as degrading network performance. One area to address when it comes to packet latency reductions is the reduction of transport time of data and control signalling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

The embodiments disclosed herein relate to mechanisms for providing configuration for uplink transmission to a wireless device 300a. In order to obtain such mechanisms there is provided a network node 200, a method performed by the network node 200, a computer program product comprising code, for example in the form of a computer program, that when run on processing circuitry of the network node 200, causes the network node 200 to perform the method.

The embodiments disclosed herein further relate to mechanisms for receiving configuration for uplink transmission from a network node 200. In order to obtain such mechanisms there is further provided a wireless device 300a, 300b, a method performed by the wireless device 300a, 300b, and a computer program product comprising code, for example in the form of a computer program, that when run on processing circuitry of the wireless device 300a, 300b, causes the wireless device 300a, 300b to perform the method.

According to embodiment disclosed herein the TTIs are shortened by introducing shortened subframes (below denoted short subframes). More precisely, the TTIs may be shortened with respect to the legacy duration, such as 1 ms in 3GPP LTE systems. With a short TTI, the subframes can be decided to have any duration in time and comprise resources on a number of OFDM or SC-FDMA symbols within a 1 ms subframe. As one example, the duration of a short subframe may be 0.5 ms, i.e., seven OFDM symbols or SC-FDMA symbols for the case with normal cyclic prefix. As another example, the duration of the short TTI may be 2 symbols.

As mentioned, one way to reduce latency is to reduce the transmission time interval (TTI), and instead of assigning resources with a time duration of 1 ms, there is then a need to assign resources with shorter duration such as a number of OFDM symbols or SC-FDMA symbols.

This implies a need for device specific control signalling that enables indication of such short scheduling assignments.

Furthermore, there is also a need to be able to dynamically switch between TTI duration, for example between legacy 1 ms TTIs as well as shorter TTIs, in order to optimize the spectral efficiency (since shorter TTIs may incur higher overhead and/or worse demodulation performance).

In uplink transmissions, one or more SC-FDMA symbols with uplink demodulation reference signals (DMRS) transmitted for each short TTI leads to an increased overhead and a corresponding decrease in data rates, when the length of the TTI is reduced.

Using scheduling with 1 ms TTIs, the wireless devices 300a, 300b are allocated frequency resources based on, e.g., bitmaps in DCI fields identifying used resource blocks. As the TTI length is shortened, this may lead to an increased signaling overhead if the allocation is specified several times per subframe. Having a grant only to a single wireless device 300a, 300b per such short TTI will limit the overhead. It might be further beneficial to share the frequency resources within a short TTI between several wireless devices 300a, 300b, while limiting the amount of control overhead.

Figure 2:
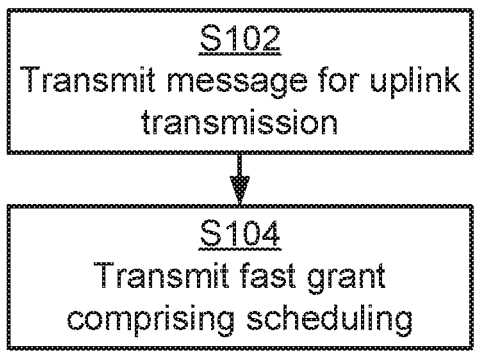
FIGS. 2, 3, 4, and 5 are flowcharts of methods according to embodiments.
Figure 3:
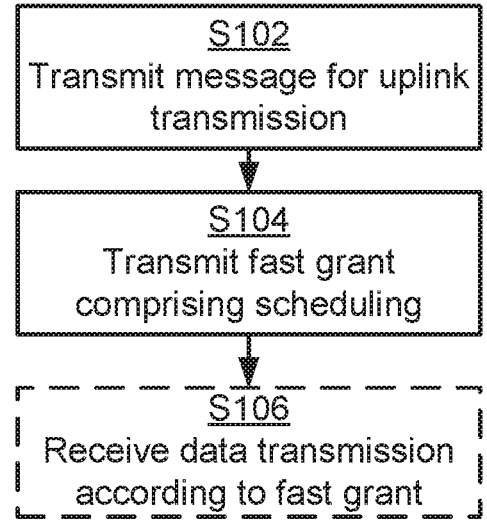
Figure 4:
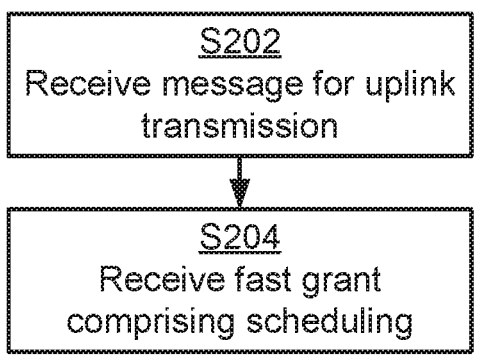
Figure 5:
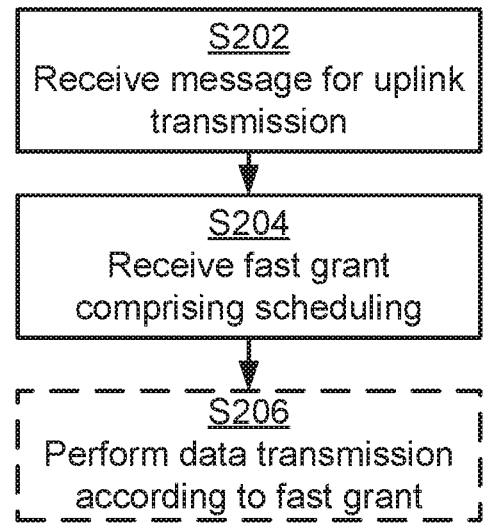

FIGS. 2 and 3 are flow charts illustrating embodiments of methods for providing configuration for uplink transmission to a wireless device 300a as performed by the network node 200. FIGS. 4 and 5 are flow charts illustrating embodiments of methods for receiving configuration for uplink transmission from a network node 200 as performed by the wireless device 300a, 300b. The methods are advantageously provided as computer programs 2420a, 2420b (see below).

Reference is now made to FIG. 2 illustrating a method for providing configuration for uplink transmission to a wireless device 300a as performed by the network node 200 according to an embodiment.

S102: The network node transmits a message comprising configuration for uplink transmission with short TTI operation.

S104: The network node transmits a fast grant comprising scheduling of an uplink short TTI transmission for the wireless device 300a.

Embodiments relating to further details of providing configuration for uplink transmission to a wireless device 300a as performed by the network node 200 will now be disclosed.

According to an embodiment the uplink transmission, to which the configuration and the scheduling relate, is to be performed in a short TTI frequency band. That is, according to an embodiment the message comprising configuration is transmitted in a TTI frequency band for short TTI operation and the fast grant comprises scheduling of the uplink short TTI transmission in the TTI frequency band for the wireless device 300a.

Reference is now made to FIG. 3 illustrating methods for providing configuration for uplink transmission to a wireless device 300a as performed by the network node 200 according to further embodiments. It is assumed that steps S102, S104 are performed as disclosed with reference to FIG. 2 and a repeated description of these steps is therefore omitted.

S106: The network node receives a data transmission from the wireless device 300a on a Physical Uplink Shared Channel (PUSCH) for short TTI operation according to the fast grant.

Reference is now made to FIG. 4 illustrating a method for receiving configuration for uplink transmission from a network node 200 as performed by the wireless device 300a, 300b according to an embodiment.

S202: The wireless device 300a, 300b receives, from the network node 200, a message comprising configuration for uplink transmission with short TTI operation.

S204: The wireless device 300a, 300b receives, from the network node 200, a fast grant comprising scheduling of an uplink short TTI transmission for the wireless device.

Embodiments relating to further details receiving configuration for uplink transmission from a network node 200 as performed by the wireless device 300a, 300b will now be disclosed.

According to an embodiment the uplink transmission, to which the configuration and the scheduling relate, is to be performed in a short TTI frequency band. That is, according to an embodiment the message comprising configuration is received in a TTI frequency band for short TTI operation and the fast grant comprises scheduling of the uplink short TTI transmission in the TTI frequency band for the wireless device 300a.

Reference is now made to FIG. 5 illustrating methods for receiving configuration for uplink transmission from a network node 200 as performed by the wireless device 300a, 300b according to further embodiments. It is assumed that steps S202, S204 are performed as disclosed with reference to FIG. 4 and a repeated description of these steps is therefore omitted.

S206: The wireless device 300a, 300b performs a data transmission on PUSCH for short TTI operation according to the fast grant.

Embodiments relating to further details of providing configuration for uplink transmission to a wireless device 300a as performed by the network node 200 and receiving configuration for uplink transmission from a network node 200 as performed by the wireless device 300a, 300b will now be disclosed.

In some aspects the message comprising configuration for uplink transmission (as transmitted in step S102 and received as in step S202) and the fast grant (as transmitted in step S104 and received as in step S204) are part of one and the same message. That is according to an embodiment the fast grant is part of the message comprising the configuration. In other words, according to this embodiment the configuration is part of the message comprising the fast grant. A single message thus comprises all scheduling information required by the wireless device 300a to perform the uplink transmission. The configuration might be decided jointly with other scheduling information to ensure an efficient uplink transmission.

In other aspects the message comprising configuration for uplink transmission and the fast grant are not part of one and the same message. That is according to another embodiment the fast grant is part of a message being different from the message comprising the configuration.

In an embodiment, the uplink short TTI configurations define the positions of reference symbols and data symbols for short TTI operation. According to an embodiment the reference symbols are uplink demodulation reference signals (DMRS).

According to an embodiment the configuration specifies that the reference symbols are positioned at symbols 3 and 10 in each subframe. According to an embodiment the configuration specifies that each TTI for short TTI operation comprises at most one reference symbol. According to an embodiment the configuration specifies that the reference symbols are positioned either first or last in each TTI for short TTI operation that comprises a reference symbol. According to an embodiment the configuration specifies that reference symbols for different TTI for short TTI operation are placed on a common symbol. According to an embodiment the configuration specifies that all TTIs for short TTI operation are slot contained. According to an embodiment at least two TTIs for short TTI operation have mutually different lengths within one subframe.

In an embodiment, the configurations are fixed for each subframe. In an embodiment, the length of each short TTI is fixed for each subframe for the wireless device 300a. Put differently, the configurations to be used in different subframes are independently assignable.

According to an embodiment the configuration is signaled by a short TTI configuration index. An example of such short TTI configuration index is provided in below Table 1. According to an embodiment the configuration further specifies a downlink TTI frequency band length.

In an embodiment, the short TTI configuration is signaled by the network node 200 transmitting a slow grant. The slow grant can be transmitted in downlink on a rate equal to or slower than once each subframe. In one embodiment, this configuration is common for a group of wireless devices 300a, 300b. Hence, according to an embodiment the slow grant is transmitted once per subframe or less frequent than once per subframe.

In an embodiment, an uplink short TTI transmission is scheduled by a fast grant. The fast grant can be transmitted on a faster rate than once each sub-frame, for example on a symbol basis in downlink. The fast grant can be device-specific. Hence, according to an embodiment the fast grant is transmitted more often than the slow grant. Hence, according to an embodiment the fast grant is transmitted more frequently than once per subframe, such as on a per symbol basis. Alternatively, the fast and slow grants may be characterized relative to each other, as grants of a more frequently transmitted type and grants of a less frequently transmitted type. Further alternatively, the fast grant may be transmitted relatively closer to the scheduled uplink transmission than a legacy uplink grant is. Furthermore, a fast grant may differ from a legacy grant as follows: a legacy grant schedules an UL transmission in a standalone fashion, while the fast grant may define the scheduling of the UL short TTI transmission by relying upon (i.e., by implicitly referring to) information carried in a preceding slow grant.

In yet another embodiment the configuration of short TTI is given by RRC signaling or a combination of RRC signaling, slow and fast grant. Hence, according to an embodiment the message is a radio resource control message or a slow grant.

The above disclosed embodiments will now be described by means of illustrative example. Reference is here made to FIGS. 6-14 schematically illustrating short TTI configurations in a subframe and FIGS. 15-19 schematically illustrating uplink grants for short TTI configurations according to embodiments. In FIGS. 6-19 the notation "sTTI" refers to a TTI for short TTI operation, the notation "R" is used to denote DMRS and the notation "S" is used to denote SRS. Note that although all illustrated subframes thus end with a SRS, this is only an example.

Figures 6, 7, 8:
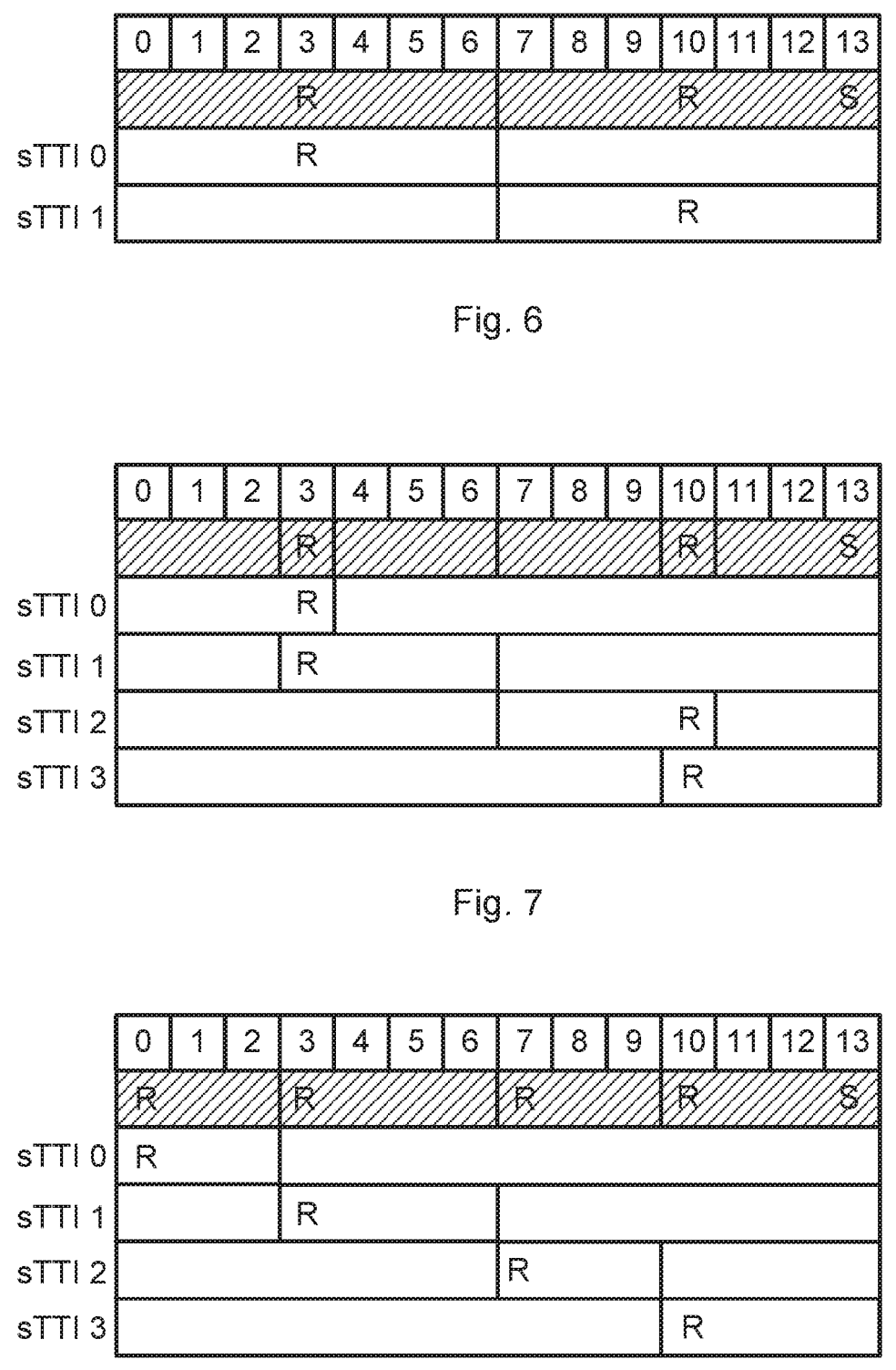

FIG. 6 and FIG. 7 illustrate examples of short TTI configurations in a subframe with 7-symbol and 4-symbol TTI lengths, respectively. The positions of the reference symbols for these two configurations are the same as for the legacy 1 ms TTI. For the 7-symbol configuration case shown in FIG. 6, the legacy subframe is divided into two slots, and each slot forms a short TTI with a single reference symbol. For the 4-symbol short TTI configuration shown in FIG. 7, the reference symbols of short TTI 0 and short TTI 1 are multiplexed or shared on the same OFDM symbol, i.e., symbol 3, and the reference symbols of short TTI 2 and short TTI 3 are multiplexed or shared on the symbol 10. DMRS multiplexing refers to different DMRS sequences multiplexed on the same OFDM symbol, whilst DMRS sharing refers to the same DMRS sequence is shared by two short TTIs which is assigned to the same UE.

Operating with the reference signal configuration given in FIG. 6 and FIG. 7 further allows the network node 200 to operate multi-user multiple input multiple output (MU-MIMO) between wireless devices 300a, 300b with different short TTI lengths, i.e. a wireless device 300a with a short TTI length of 4 is multiplex with a wireless device 300b with a short TTI length of 7. Further, ending the short TTI at slot boarder allows time-multiplexing of the short TTIs of different lengths. Below it can be observed that it is possible to do this for a short TTI length of 4 and 7. This results in a high resource usage from the network node perspective. Further, placing the reference signals in the same time occasion between different cells reduces inter-cell interference if the cells are synchronized.

FIG. 8 illustrates an example of short TTI configurations in a subframe with 3- or 4-symbol TTI lengths. Compared to the configuration shown in FIG. 7, the DMRS overhead is increased for this 3/4 symbol short TTI configuration, since there are 2 symbols used for DMRS within each slot.

The benefit of having a DMRS symbol transmitted at the beginning of each short TTI is that the network node 200 might be able to start decoding the data right after the channel estimation. Further, with a configuration of short TTI length of 3 and 4 it is beneficial to place the short TTI of length 4 at the second position within the slot as in the last slot in the subframe there could be a potential SRS transmission and by that shortening the short TTI to length 3. This shortening does not require specific signaling for that slot but rather the wireless device 300a assumes that it is configured with cell specific SRS transmissions within that subframe.

Figures 9A, 9B:
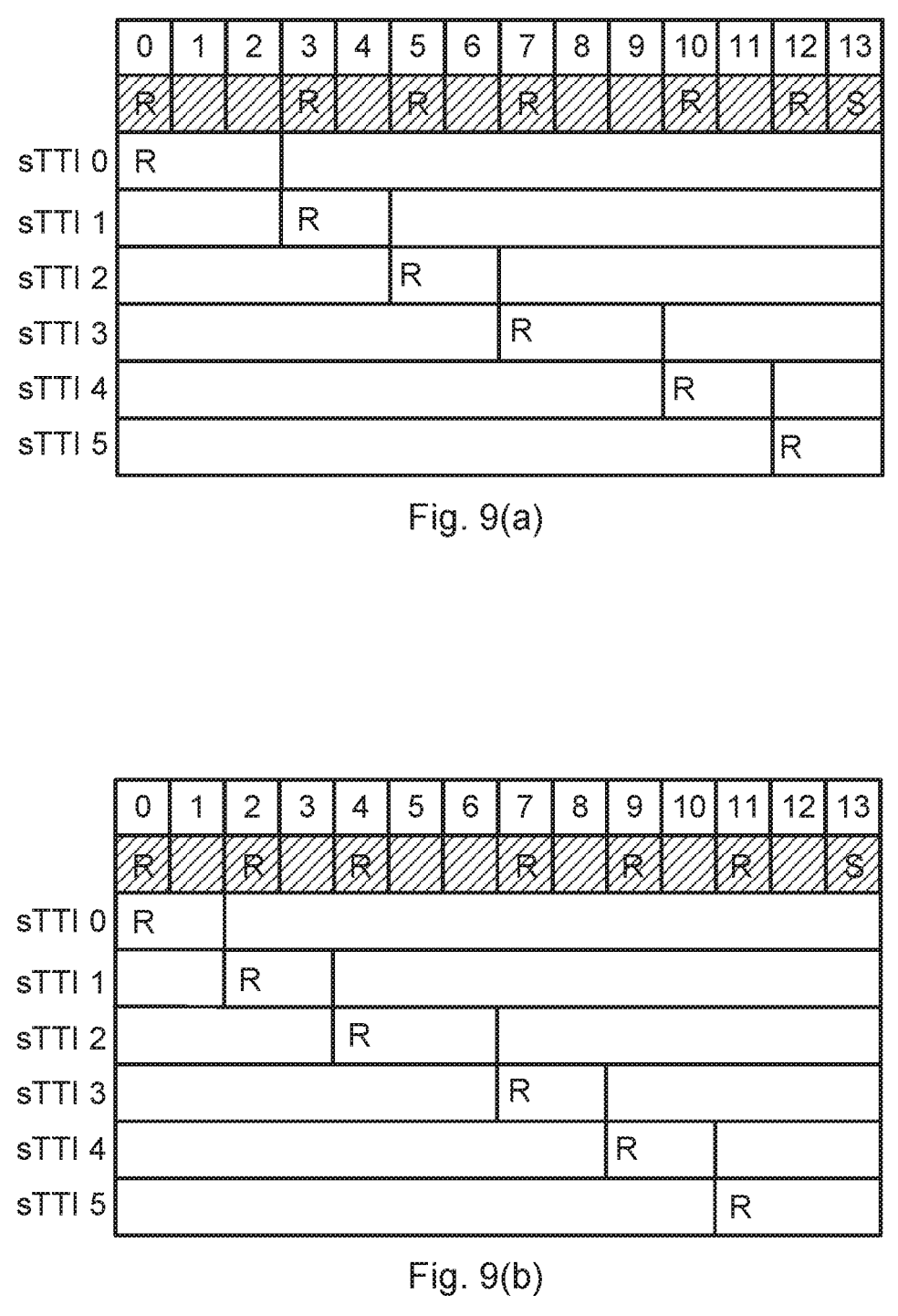
Figures 10, 11:
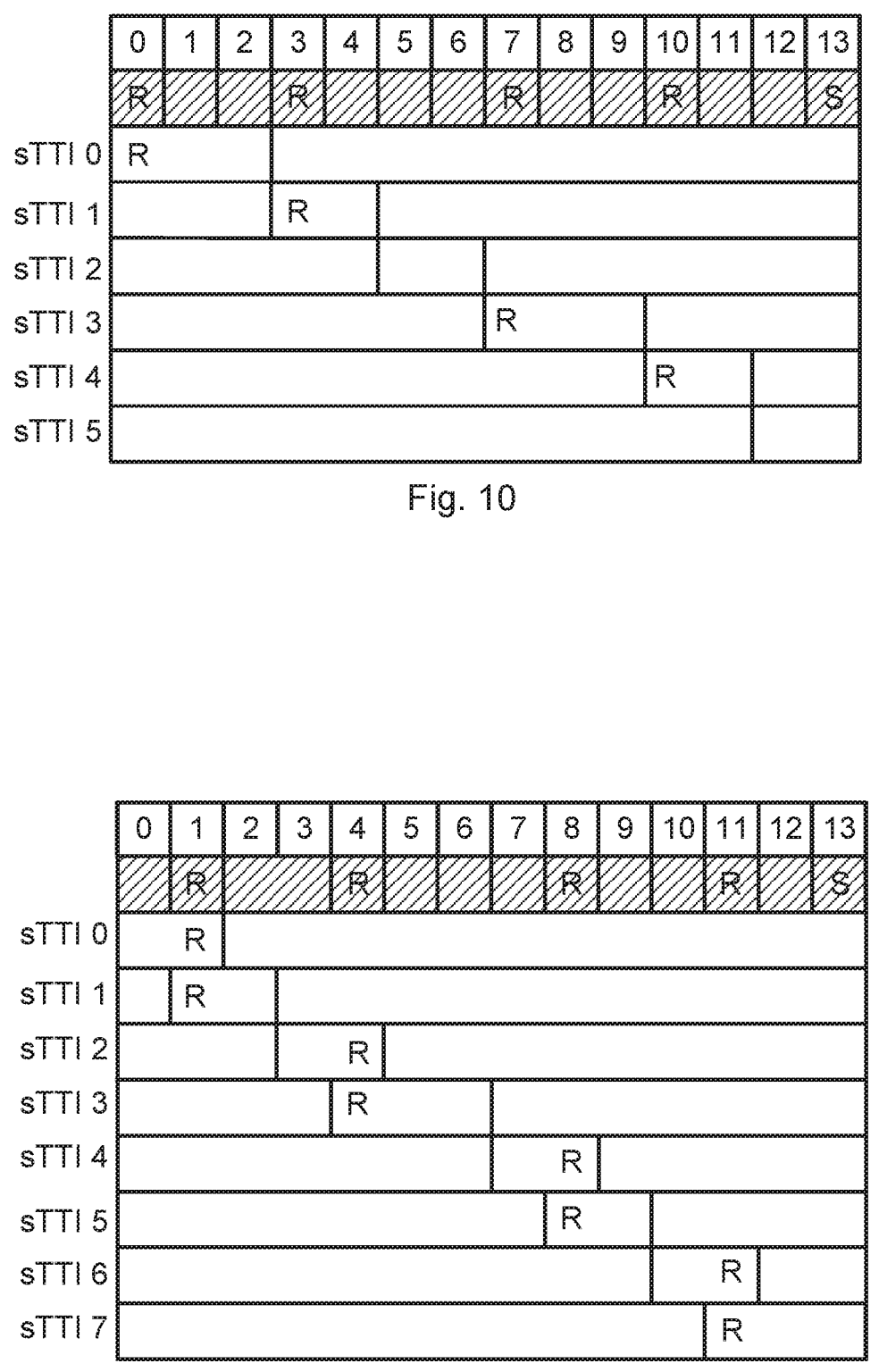

FIG. 9(a) shows an example of short TTI configuration in a subframe with four 2-symbol short TTIs and two 3-symbol short TTIs. FIG. 9(b) will be referred to below. In the configuration of FIG. 9(a), a DMRS symbol is transmitted at the beginning of each short TTI. If short TTI 1 and short TTI 2 are assigned to the same wireless device 300a and the coherence time of the channel is larger than 4 symbols, the DMRS symbol in short TTI 2, i.e., symbol 5, can be used for data transmission instead, as shown in FIG. 10. This dynamic DMRS insertion can reduce the DMRS overhead. The example shown in FIG. 10 explicitly specifies the short TTIs, i.e., short TTI 2 and short TTI 5, where dynamic DMRS insertion is applied. Another way of defining this configuration is to implicitly indicate the DMRS insertion short TTIs by the scheduling grant. That is, if the wireless device 300a is scheduled in the previous TTI and send a DMRS there, then, the wireless device 300a shall not send a DMRS in the following short TTIs. To avoid the impact of legacy intra-subframe frequency hopping, dynamic DMRS insertion might only be allowed within the same slot.

Figures 12, 13:
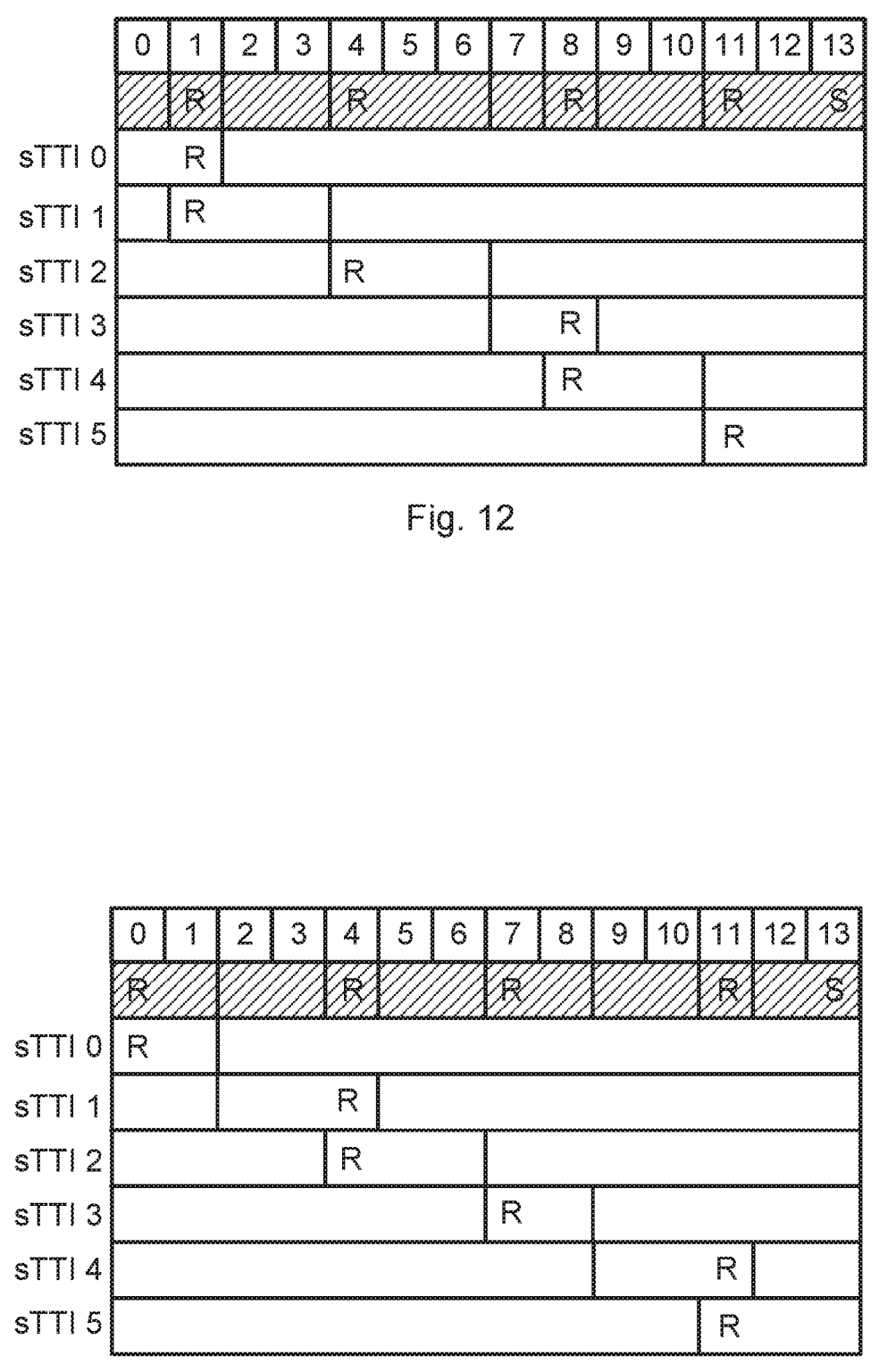

FIG. 11 shows an example of a short TTI configuration in a subframe with six 2-symbol short TTIs and two 3-symbol short TTIs. FIG. 12 shows an example of a short TTI configuration in a subframe with two 2-symbol short TTIs and four 3-symbol short TTIs. In these configurations, DMRS multiplexing or DMRS sharing is supported. For example, the reference symbols of short TTI 0 and short TTI 1 are multiplexed, or shared, on the same OFDM symbol, i.e., symbol 1. FIG. 13 shows another example of short TTI configuration in a subframe with two 2-symbol short TTIs and four 3-symbol short TTIs where DMRS sharing or DMRS multiplexing can be applied between short TTI 1 and short TTI 2, for instance.

FIG. 9(a) shows an example of 2-symbol short TTI configuration in a subframe with 8 short TTIs. FIG. 9(b) will be referred to below. For the configuration in FIG. 9(a), it is assumed that short TTI 6 and short TTI 7 are assigned to the same wireless device 300a; therefore, the channel estimation of short TTI 7 is based on the DMRS transmitted in short TTI 6. When there is no SRS in symbol 13, which might be most common, then it is possible use the last short TTI (number 7) for a 2-symbol TTI with its own DMRS.

In all examples shown above, the short TTI configurations are slot contained. That is, there is no short TTI across the slot boundary. This is beneficial, since the frequency bands for short TTI transmissions may vary between two slots within a subframe when intra-subframe frequency hopping is supported for legacy wireless devices.

In some embodiments it is assumed that a set of short TTI configurations is predefined and known to both the network node 200 and the wireless deices 300a, 300b using short TTI operation. The short TTI configuration to be used by the wireless device 300a can be signaled by the network node 200 transmitting a slow grant. In another embodiment this configuration can be performed using higher layer signaling, e.g. RRC signalling.

As an example, consider that eight short TTI configurations as shown in FIGS. 6-14 are predefined for uplink short TTI transmissions. A short TTI configuration index field of 3 bits can thus be introduced in a slow grant or by RRC configurations, with an example mapping of configurations given in Table 1.

TABLE 1

Example mapping for short TTI configurations within a subframe.

Figure 14:
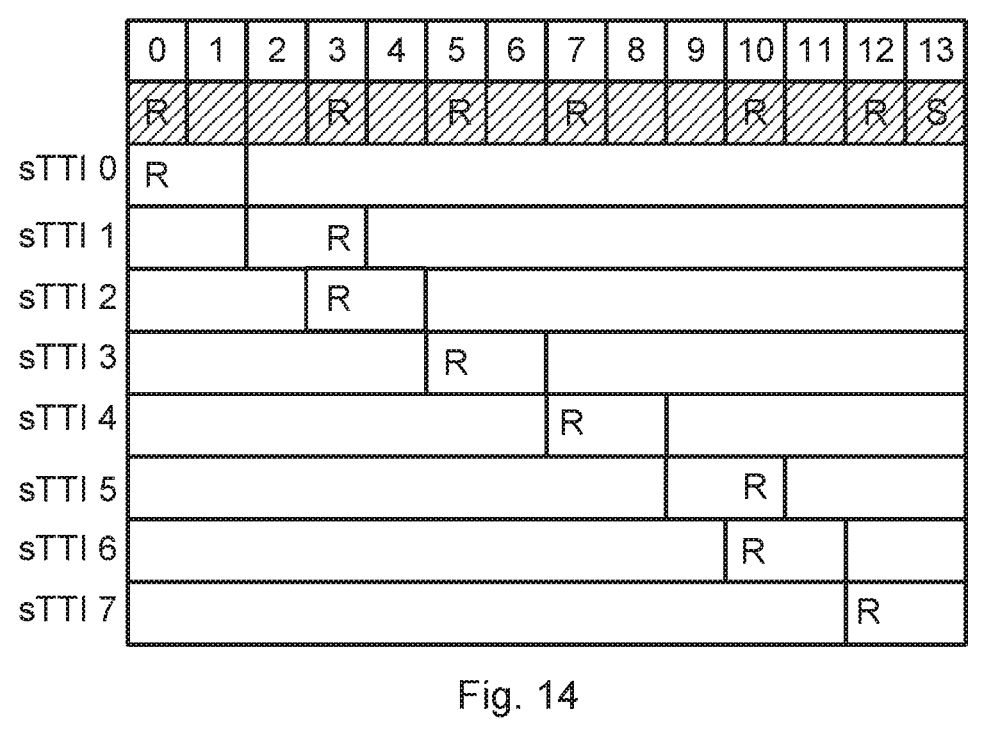

| Short TTI configuration index | Bits field | Short TTI configurations | Meaning |
| --- | --- | --- | --- |
| 0 | 000 | Figure 6 | 7-symbol TTI |
| 1 | 001 | Figure 7 | 4-symbol TTI, multiplexed |
| 2 | 010 | Figure 8 | 2 × 3 + 2 × 4 symbol |
| 3 | 011 | Figure 9 | 4 × 2 + 2 × 3 symbol |
| 4 | 100 | Figure 10 | 4 × 2 + 2 × 3 symbol, allow dynamic DMRS |
| 5 | 101 | Figure 11 | 6 × 2 + 2 × 3, multiplexed |
| 6 | 110 | Figure 12 or 13 | 2 × 2 + 4 × 3, multiplexed |
| 7 | 111 | Figure 14 | 8 × 2, multiplexed, allow dynamic DMRS |

Since the RS pattern in FIGS. 6-14 are slot contained, i.e. the DMRS pattern simply repeats in all slots, it is possible to extend table 1 to include short TTI configurations where the first slot and the second slot follow different RS patterns. For instance, the first slot could follow the pattern given in FIG. 9 in symbols 0-6 while the second slot of the subframe follows the pattern given in FIG. 11 in symbols 7-13. To do so, the number of bits of the short TTI configuration can be increased to point to these additional short TTI configurations.

Alternative signaling to the configuration index can be used as well. In an embodiment separate signaling is used to indicate the sTTI length and the positions of the reference symbols in the subframe. Two separate signaling can therefore be introduced: one signaling for the sTTI length, and another signaling for positions of the reference symbols. That is, according to an embodiment the configuration is signaled by a first parameter indicating length of the short TTI and a second parameter indicating positions of reference symbols and data symbols for short TTI operation. The signaling for positions of reference symbols can, for example, indicate the following three cases: In a first case a reference symbol is present in all short TTIs of the subframe and is always placed in the beginning of all short TTIs of the subframe; in a second case a reference symbol is present in all short TTIs of the subframe and it is not always placed in the beginning of all short TTIs of the subframe; and in a third case a reference symbol is not present in all short TTIs of the subframe (this is useful e.g., in case of dynamic DMRS insertion).

The sTTI length indication and the reference symbol positions indication together help the wireless device 300a, 300b to know which configuration is used for the subframe. In case different reference signal patterns are wanted for the first and second slot of the subframe, the sTTI length indication and the reference symbol positions indication could be introduced for the first slot separately with respect to the second slot. Thus, overall the following fields could be used for signaling to the wireless device 300a, 300b: a field for sTTI length in the first slot, a field for reference signal positions in the first slot, a field for sTTI length in the second slot and a field for reference signal positions in the second slot.

Based on the decoded slow grant within the current subframe, the wireless devices 300a, 300b using short TTI operation are able to know the short TTI configurations for the next or future subframes. Each uplink short TTI transmission within a subframe can be scheduled by a dedicated fast grant. The fast grant comprises information about transport format and DMRS cyclic shift indices in case of MIMO transmissions. Below it will for illustrative purposes be assumed that the uplink fast grant timing is around 4 times of the scheduled uplink short TTI length.

Another possibility is that the wireless device 300a is configured by the network node 200 to operate according to, say, FIG. 8 on either a slow grant basis or higher layer signals, such as RRC signalling. Further, the DCI message can indicate whether or not to apply the short TTI according to FIG. 8 or FIG. 9. This enables the short TTI to be extended to length 4 for the first short III in each slot and the RS in the end of that short TTI to be replaced. This would allow the network node 200 to dynamically select whether or not to use DMRS multiplex, DMRS sharing or neither of those. This concept can also be extended to other short TTI length combinations.

As outlined above, the sTTI length could configured by RRC per wireless device 300a, 300b. For example one wireless device could be configured with the sTTI length of 7 symbols, another wireless device of sTTI length of 3/4 symbols, yet another wireless device of length 2/3 symbols. All the wireless devices 300a, 300b may operate in the same sTTI frequency band. The wireless devices 300a, 300b may than be configured to operate with reference symbol multiplex/sharing at different positions within the sTTI based on a bit field in the fast or slow DCI message. The meaning of the bit field may, however, be differently interpreted by different wireless devices 300a, 300b depending on the sTTI length that the different wireless devices 300a, 300b are configured with. For example, a wireless device 300a, 300b that is configured with sTTI length 7 may not apply reference symbol multiplexing or sharing at all. A wireless device 300a, 300b that is configured with sTTI length of 4/3 may be configured to switch between the different sTTI definitions in FIG. 7 or FIG. 8. Further, this switching could also be performed based on scheduling. That is, if the wireless device 300a, 300b is scheduled in multiple consecutive sTTI on the same frequency resources the wireless device 300a, 300b can decide whether or not to include the reference symbols. The same concept can also be applied for sTTI configurations with lengths of 2/3 OFDM symbols. Within this concept the wireless device 300a, 300b does not need to operate according to the signalling in Table 1, however the basic configurations given by Table 1 need to be specified. The wireless device 300a, 300b does thereby not need to operate according to the complete list in Table 1 but only a subset of those configurations. The wireless device 300a, 300b can then select only between those configurations that are included in the subset. The wireless device 300a, 300b would, for example, then select which configuration to use based on implicit scheduling or indication within the DCI message. In this respect, there can be different sTTI patterns for each given configured sTTI length. For example, the two different patterns shown in FIG. 7 and FIG. 8 can be used for a configuration if the sTTI length is 3/4 symbols. If the sTTI length is configured by RRC, then not all candidate configurations (such as all entries in Table 1) need to be signaled to the wireless device 300a, 300b (in the DCI message). Instead, only one bit (in the DCI message) is needed to indicate to the wireless device 300a, 300b whether to assume FIG. 7 or FIG. 8.

Figure 15:
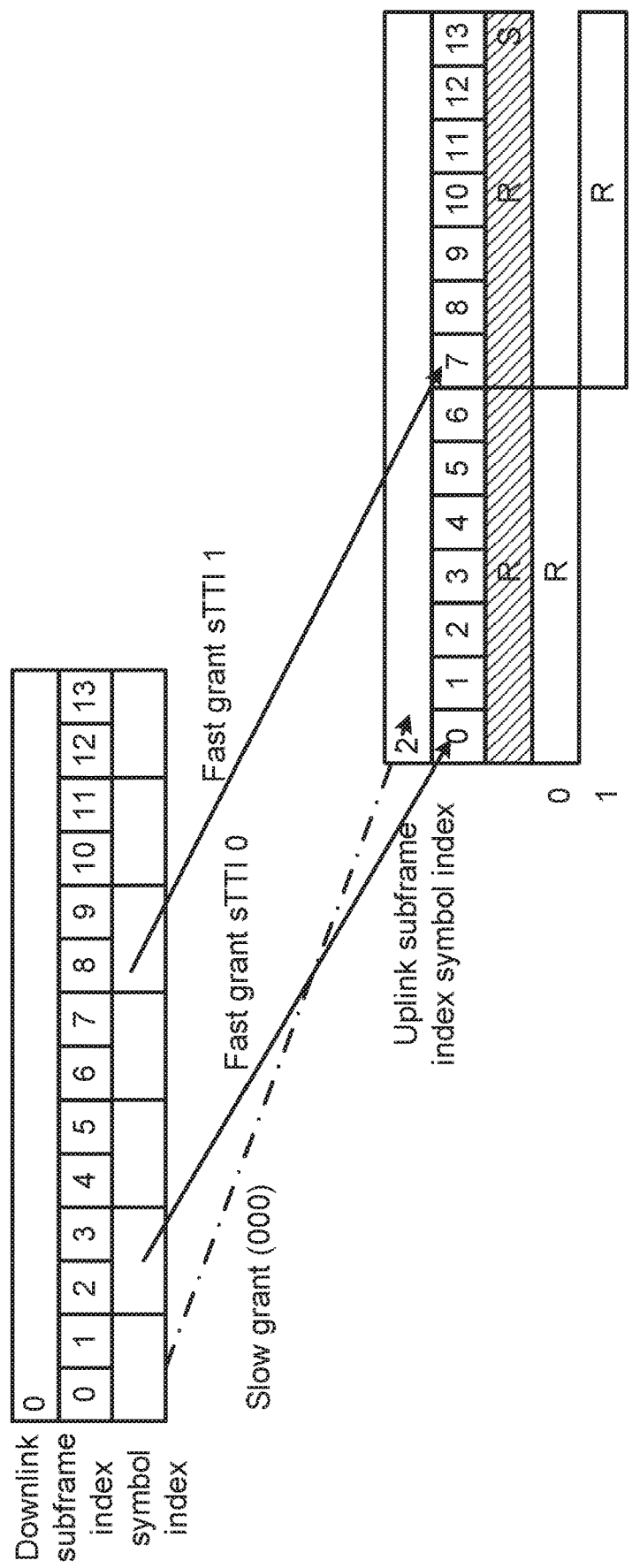
FIGS. 15-19 schematically illustrate uplink grants for short TTI configurations according to embodiments.

In FIGS. 15-19 slow grants are illustrated by dash-dotted arrows and fast grants are illustrated by solid arrows. FIG. 15 illustrates the proposed uplink grants for short TTI configuration 0. For short TTI configuration 0 with 7-symbol short TTIs, the detected slow grant is valid for two subframes later. For other short TTI configurations, i.e., the configurations with short TTI lengths no greater than 4 symbols, the detected slow grant is valid for the next subframe.

Figure 16:
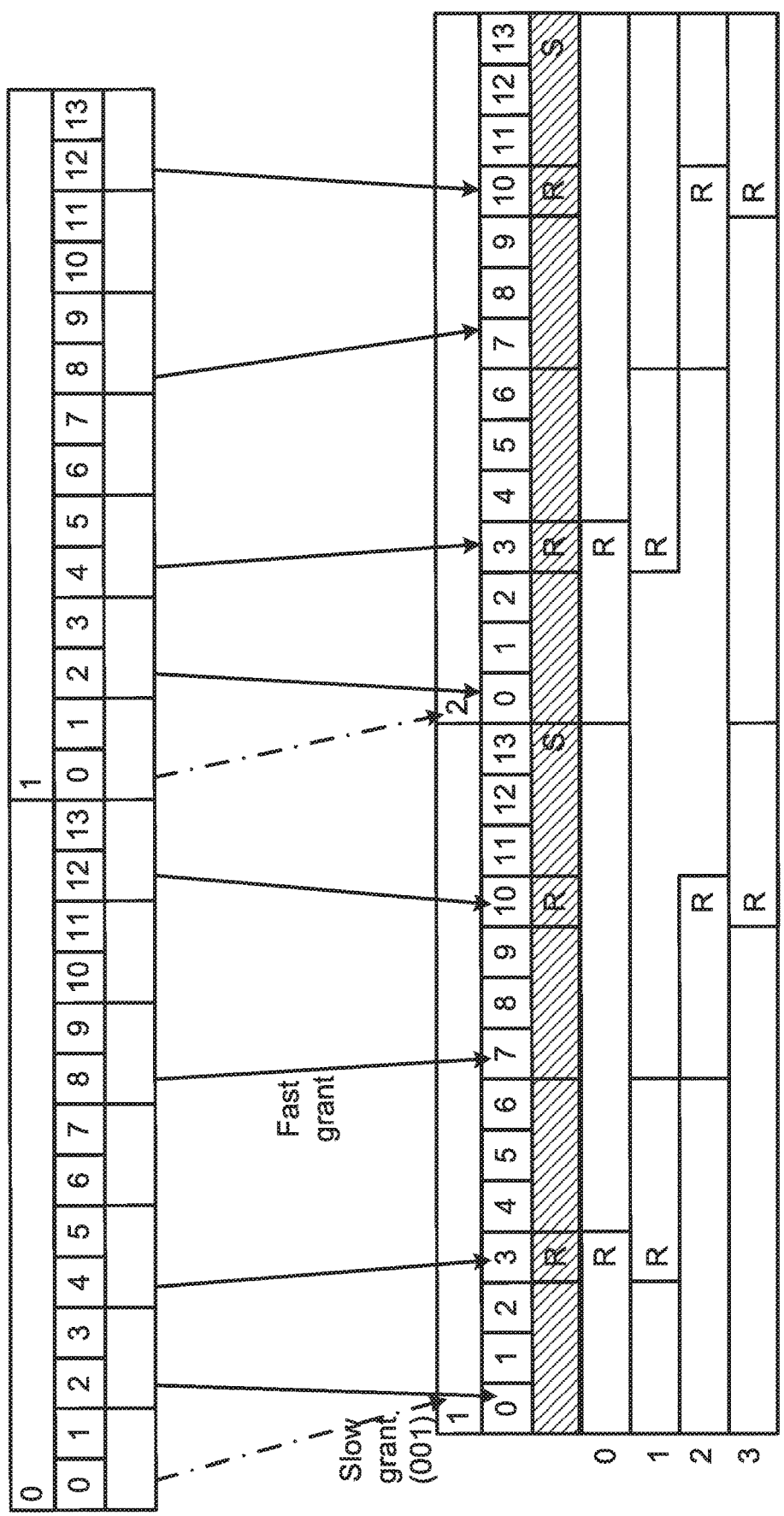
Figure 17:
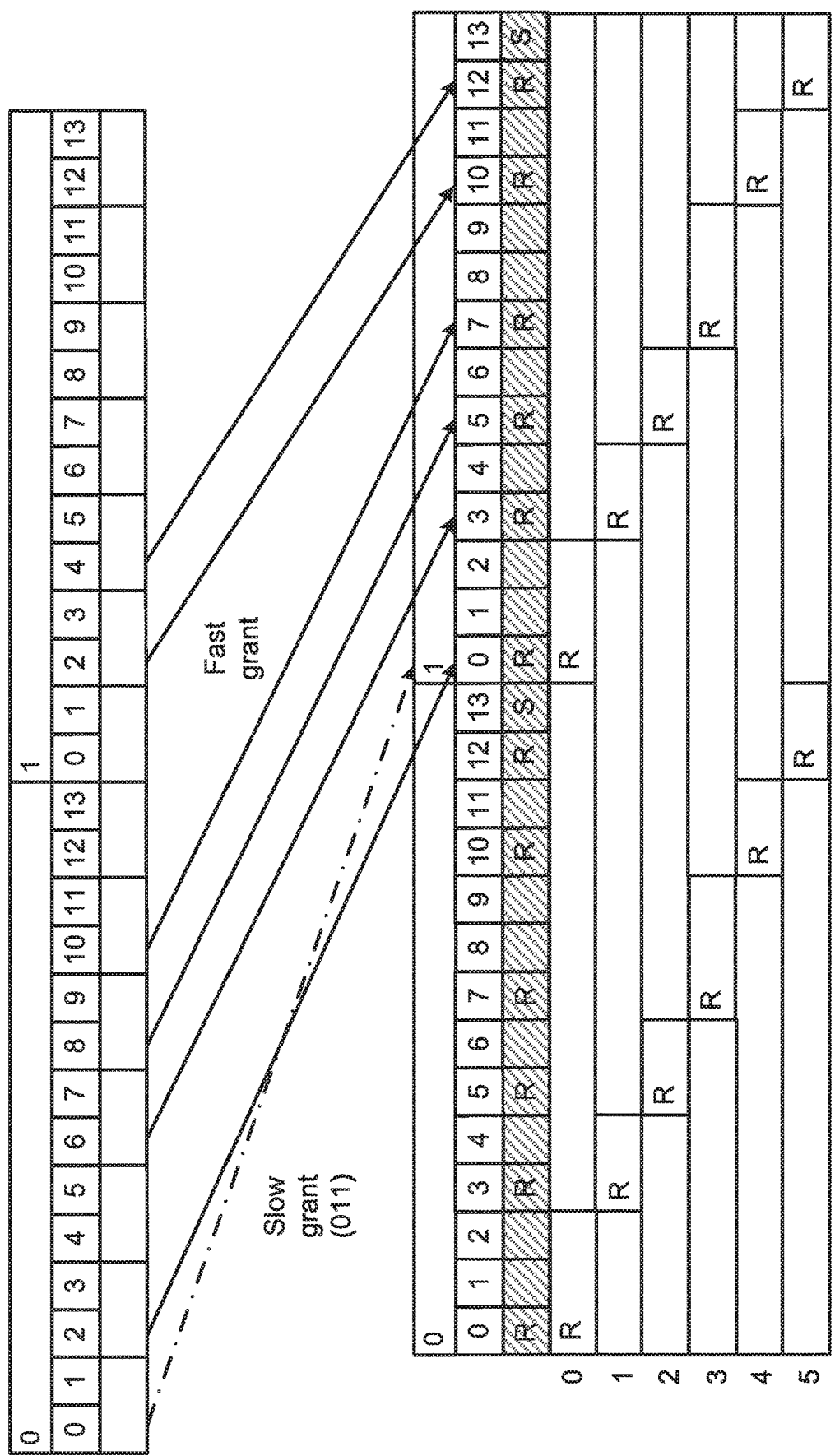

FIG. 16 and FIG. 17 illustrate the proposed uplink grants for short TTI configuration 1 and short TTI configuration 3, respectively.

Figure 18:
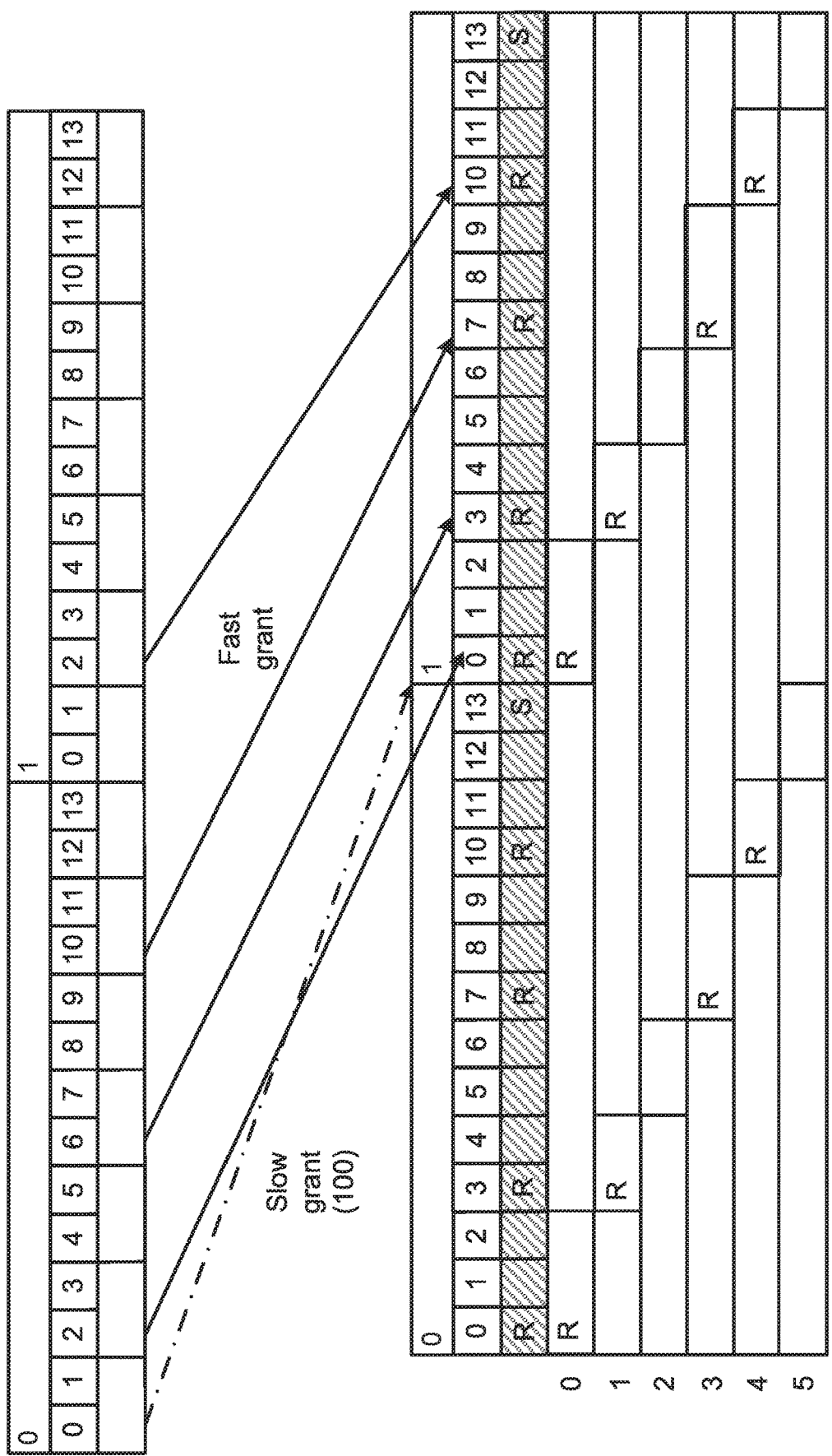

FIG. 18 illustrates the proposed uplink grants for short TTI configuration 4, where dynamic DMRS insertion is supported. In this case, only one fast grant is needed for scheduling short TTI 0 and short TTI 1 to a single wireless device 300a, and the same applies for the scheduling of short TTI 3 and short TTI 4.

Figure 19:
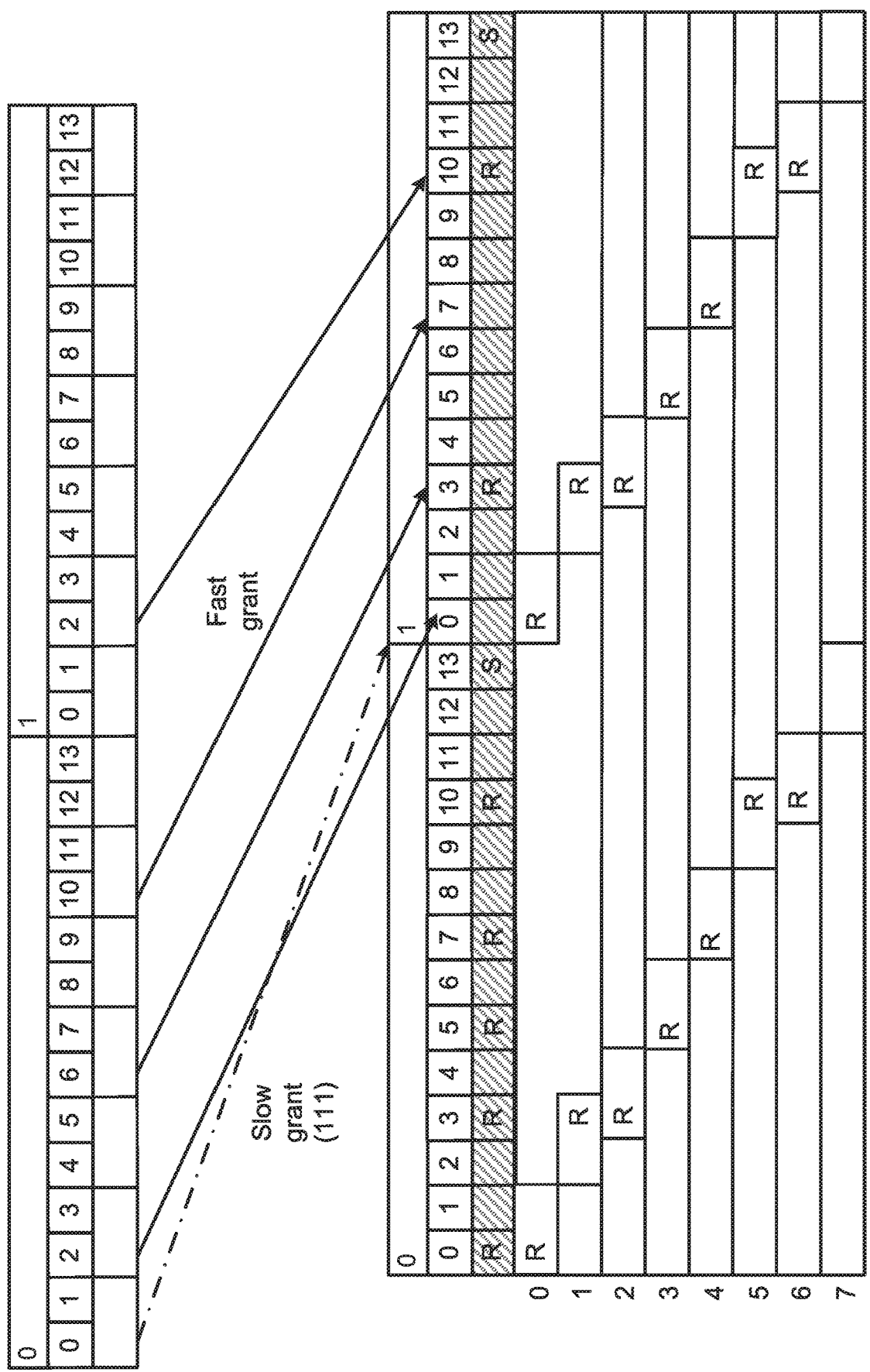

FIG. 19 illustrates the proposed uplink grants for short TTI configuration 7.

For all the predefined configurations listed in Table 1, there is a one-to-one mapping between one downlink short TTI and an uplink short TTI, as illustrated in FIG. 15-19. This is beneficial since there is no extra bit field needed for indicating timing of the scheduled uplink short TTI.

If there is a switch of configurations between subframes and the configurations are not configuration 0 (with 7 symbol short TTIs), then, the one-to-one mapping between one downlink short TTI and an uplink short TTI can still be maintained. This is because that by decoding the slow grant within the current subframe, the wireless devices 300a, 300b using short TTI operation are able to know the short TTI configuration for the next subframe from the decoded 3 bits field defined in Table 1. Since there is a one-to-one mapping between one downlink short TTI and an uplink short TTI for each configuration, the one-to-one mapping is maintained even with this configuration switching between subframes.

Assume now, for example, that configuration 0 is to be used in subframe 2, and configuration 1 is to be used in subframe 1. Then, two slow grants can be sent from subframe 0; one for configuration 1 and the other for configuration 2. By decoding the short TTI configuration index field, i.e., the 3 bits shown in the slow grant, the wireless device 300a will be able to correctly determine which short TTI configuration this slow grant applies for, and thereby, be able to correctly determine for which subframe the slow grant is valid and the corresponding short TTI configuration for this subframe. For this example, there will be two fast grants transmitted for downlink symbol 2 of subframe 0. If these two fast grants are sent to the same wireless device 300a, then a flag can be inserted in the fast grant to indicate whether this fast grant is for configuration 0, i.e., the 7-symbol configuration, or for any of the other configurations.

For a short TTI configuration where the number of uplink short TTIs is larger than the number of downlink short TTIs, a delay offset parameter might be needed in the fast grant to indicate the scheduled uplink short TTI. In this case, several uplink grants can be included in each downlink short TTI. Alternatively, several fast grants can be transmitted with the PDCCH.

The uplink patterns outlined in Table 1 comprise multiple different TTI lengths, which may all be configured together with a downlink TTI length of 2 OFDM symbols with an uplink grant timing as outlined above. For a different downlink TTI length, certain cases in Table 1 might not be supported. As one example, if the downlink TTI length is 4, the uplink TTI length might not be 2, since this requires multiple UL grants per downlink TTI, which might not be supported.

In an embodiment, the downlink TTI length and the uplink TTI length can be indicated together with a limited set of bits. As an example, for 4 different TTI lengths, the configuration can be as in Table 2. Here, the uplink configuration index is as of Table 1, and the downlink TTI length can be 2, 3, 4, or 7 OFDM symbols. In this example, 4 bits would suffice for downlink TTI and uplink TTI indication in the slow grant, or using RRC signalling.

TABLE 2

Combined DL and UL TTI indication, where the UL configuration index follows the description in Table 1.

| Index | Downlink TTI length | Uplink configuration index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 3 | 0 |
| 9 | 3 | 1 |
| 10 | 3 | 2 |
| 11 | 3 | 4 |
| 12 | 4 | 0 |
| 13 | 4 | 1 |
| 14 | 4 | 2 |
| 15 | 7 | 0 |

Aspects of the herein disclosed embodiments are further given in the included implementation examples provided below relating to physical design aspects of sPUSCH.

Figure 20:
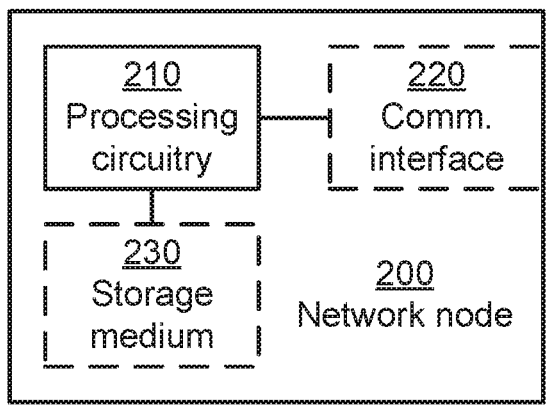
FIG. 20 is a schematic diagram showing functional units of a network node according to an embodiment.

FIG. 20 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 2410a (as in FIG. 24), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S106, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications at least with a wireless device 300a, 300b. As such the communications interface 220 may comprise one or more transmitters and receivers, comprising analogue and digital components and a suitable number of antennas for wireless communications and ports for wireline communications.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 21:
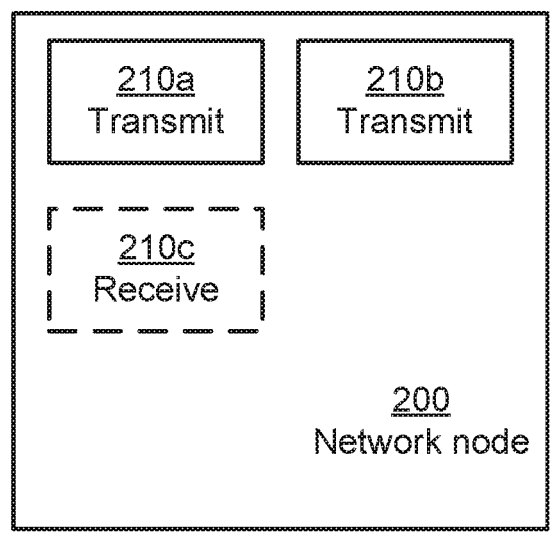
FIG. 21 is a schematic diagram showing functional modules of a network node according to an embodiment.

FIG. 21 schematically illustrates, in terms of a number of functional modules, the components of a network node 200 according to an embodiment. The network node 200 of FIG. 21 comprises a number of functional modules; a transmit module 210a configured to perform step S102, and a transmit module 210b configured to perform step S104. The network node 200 of FIG. 21 may further comprise a number of optional functional modules, such as a receive module 210c configured to perform step S106. In general terms, each functional module 210a-210c may be implemented in hardware or in software. Preferably, one or more or all functional modules 210a-210c may be implemented by the processing circuitry 210, possibly in cooperation with functional units 220 and/or 230. The processing circuitry 210 may thus be arranged to from the storage medium 230 fetch instructions as provided by a functional module 210a-210c and to execute these instructions, thereby performing any steps of the network node 200 as disclosed herein.

The network node 200 may be provided as a standalone device or as a part of at least one further device. For example, the network node 200 may be provided in a node of the radio access network 110 or in a node of the core network 120. For example, the network node 200, or at least its functionality, could be implemented in a radio base station, a base transceiver station, a NodeBs, an evolved NodeBs, an access points, or an access node. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, in the radio access network 110.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 20 the processing circuitry 210 may be distributed among a plurality of devices, or nodes. The same applies to the functional modules 210a-210c of FIG. 21 and the computer program 2420a of FIG. 24 (see below).

Figure 22:
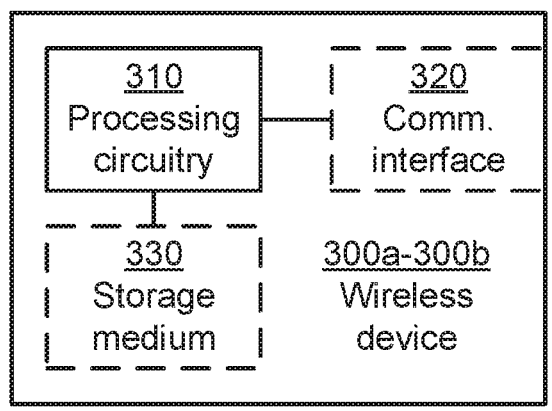
FIG. 22 is a schematic diagram showing functional units of a wireless device according to an embodiment.

FIG. 22 schematically illustrates, in terms of a number of functional units, the components of a wireless device 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 2410b (as in FIG. 24), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a, 300b to perform a set of operations, or steps, S202-S208, as disclosed above. For example, the storage medium 330 may store the set of operations, and the processing circuitry 310 may be configured to retrieve the set of operations from the storage medium 330 to cause the wireless device 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a, 300b may further comprise a communications interface 320 for communications at least with a network node 200. As such the communications interface 320 may comprise one or more transmitters and receivers, comprising analogue and digital components and a suitable number of antennas for wireless communications and ports for wireline communications.

The processing circuitry 310 controls the general operation of the wireless device 300a, 300b e.g. by sending data and control signals to the communications interface 320 and the storage medium 330, by receiving data and reports from the communications interface 320, and by retrieving data and instructions from the storage medium 330. Other components, as well as the related functionality, of the wireless device 300a, 300b are omitted in order not to obscure the concepts presented herein.

Figure 23:
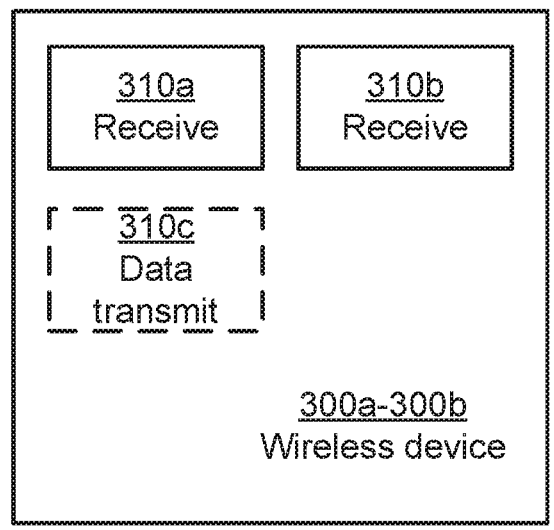
FIG. 23 is a schematic diagram showing functional modules of a wireless device according to an embodiment.

FIG. 23 schematically illustrates, in terms of a number of functional modules, the components of a wireless device 300a, 300b according to an embodiment. The wireless device 300a, 300b of FIG. 23 comprises a number of functional modules; a receive module 310a configured to perform step S202, and a receive module 310b configured to perform step S204. The wireless device 300a, 300b of FIG. 23 may further comprises a number of optional functional modules, such as a data transmit module 310c configured to perform step S206. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional module 310a-310c and to execute these instructions, thereby performing any steps of the wireless device 300a, 300b as disclosed herein.

Figure 24:
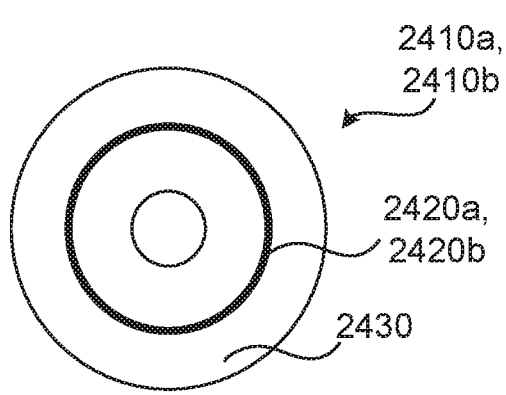
FIG. 24 shows one example of a computer program product comprising computer readable means according to an embodiment.

FIG. 24 shows one example of a computer program product 2410a, 2410b comprising computer readable means 2430. On this computer readable means 2430, a computer program 2420a can be stored, which computer program 2420a can cause the processing circuitry 210 and thereto operatively coupled entities and devices, such as the communications interface 220 and the storage medium 230, to execute methods according to embodiments described herein. The computer program 2420a and/or computer program product 2410a may thus provide means for performing any steps of the network node 200 as herein disclosed. On this computer readable means 2430, a computer program 2420b can be stored, which computer program 2420b can cause the processing circuitry 310 and thereto operatively coupled entities and devices, such as the communications interface 320 and the storage medium 330, to execute methods according to embodiments described herein. The computer program 2420b and/or computer program product 2410b may thus provide means for performing any steps of the wireless device 300a, 300b as herein disclosed.

In the example of FIG. 24, the computer program product 2410a, 2410b is illustrated as an optical disc, such as a CD (compact disc) or a DVD (digital versatile disc) or a Blu-Ray disc. The computer program product 2410a, 2410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 2420a, 2420b is here schematically shown as a track on the depicted optical disk, the computer program 2420a, 2420b can be stored in any way which is suitable for the computer program product 2410a, 2410b.

Detailed implementation examples relating to physical design aspects of sPUSCH will now be provided.

The implementation examples concern the physical layer design for TTI shortening for uplink transmissions on PUSCH and describe how to extend the design for PUSCH with a shortened TTI length.

Aspects for the short TTI (sTTI) configurations for uplink transmission will now be outlined together with considering different sTTI lengths. During the study item on latency reduction multiple sTTI lengths are being considered and it is here assumed that multiple sTTI lengths will be supported. However the actually design detail is valuable even if a single sTTI length is supported.

Uplink frequency hopping on slot basis can be applied to PUSCH transmissions. This implies that the frequency bands allocated for uplink sTTI transmissions may vary between two slots within a subframe when intra-subframe frequency hopping is supported for wireless devices not operating with sTTI. Such operation may require that the sTTI band in itself follows the same hopping pattern. Further to allow a good resource utilisation it would be good to be able to multiplex wireless devices operating with different sTTI lengths in the same sTTI band. If one wireless device applies slot based sTTI length and another wireless device operates with a shorter sTTI bandwidth the resource utilisation becomes more efficient if they can be staked after each other in time. Therefore, uplink sTTI transmission might not be supported across slot-boundary.

Hence, according to an embodiment uplink sTTI transmission is not mapped across a slot boundary.

Further to simplify the design it could be advantageous if the general sTTI structure is the same in both slots in a subframe for a given sTTI length. With of course of the exception that SRS may be transmitted in the last OFDM symbol in the second slot. However, for a given configured sTTI length, the starting and ending positions of the different sTTIs should be the same in the first slot and in the second slot of a subframe.

Hence, according to an embodiment a common sTTI design is used for both slots in a subframe for sPUSCH for a given sTTI length.

To further progress the design it could be advantageous to identify the different sTTI pattern options for sPUSCH depending on the sTTI length. This is also discussed in Tdoc R1-165296, Physical design aspects of sPUSCH, Ericsson, 3GPP TSG-RAN WG1 #85, Nanjing, P.R. China, 23-27 May 2016. The same discussion is continued here for sPUSCH in more specific detail regarding the DMRS position. For sPUSCH there are in principle three different sTTI lengths to consider: 7, 3/4, and 2/3 OFDM symbols. The previously described design assumptions together with the existence of potential SRS transmission will make it difficult to support a sTTI pattern having only 2 or 4 OFDM symbols as sTTI length.

Examples of short TTI patterns for sPUSCH are given in FIGS. 6, 8, and 9. In these patterns, the DMRS symbol is placed at the beginning or in the middle of the sTTI so that the decoding of sPUSCH can start before the end of the sTTI. This enables the network node to know earlier if a retransmission is needed and to schedule it with reduced delay.

Hence, according to an embodiment sPUSCH patterns with early position of DMRS within sTTI are supported.

Another aspect to consider further is the benefit of reusing the current DMRS positions of PUSCH for sPUSCH as this might improve channel estimation by reducing inter-cell interference from neighbouring cells. Another benefit of having common DMRS positions for different UL sTTI configurations is that it allows the network node to operate MU-MIMO between wireless devices with different sTTI lengths. If the usage of common DMRS positions for different sTTI lengths is seen as beneficial, the pattern in FIG. 9(*a*) is more suitable than the one in FIG. 9(*b*) for 2 symbol TTI length. However, if SRS transmission is scheduled, the last sTTI of FIG. 9(*a*) is unusable, while it is not the case with FIG. 9(*b*).

Thus, it might be advantageous to have common DMRS positions between sPUSCH and PUSCH and also between sPUSCH patterns of different sTTI lengths.

It has been shown in the link-level results and system evaluations in 3GPP TR 36.881, Study on latency reduction techniques for LTE, v0.6.0 (2016 March) or v0.7.0 (2016 June) or v14.0.0 (2016 July), that to limit the RS overhead is beneficial to support both DMRS multiplex and DMRS sharing. DMRS multiplexing is defined by multiple wireless devices share the same DMRS resource but not the same resources for the data part of sPUSCH and DMRS sharing is defined by that the same wireless device only transmits a single RS when transmitting multiple sTTIs. By definition it is not possible to support DMRS multiplexing for a slot based sTTI length (although MU-MIMO can be supported). DMRS sharing would potentially be possible to support for a slot based sTTI length. However the gains with supporting DMRS sharing will become larger for smaller sTTI lengths as the proportional overhead of the DMRS becomes larger.

According to an embodiment, for sTTI lengths of an OFDM symbol length of 3/4 and 2/3, DMRS position can be shared but not the data part from multiple wireless devices for an sTTI transmission, i.e. DMRS multiplexing. According to an embodiment, for sTTI lengths of an OFDM symbol length of 3/4 and 2/3, for consecutive sPUSCH transmissions by the same wireless device, DMRS can be included only in a subset of them, i.e. DMRS sharing. DMRS sharing might be supported for an sTTI length of 7 OFDM symbols.

From a broad point of view it might be preferable that DMRS multiplexing and DMRS sharing are not made mandatory to operate for certain sTTI lengths but instead can be used if the network node chooses to use them. DMRS multiplexing and DMRS sharing have benefits in terms of RS overhead but they have drawbacks if used for high MCS transmissions or in very high delay spread scenarios. The network node should thus be able to switch between these two modes of operation. As shown in FIG. 2 it is possible to allow operation of DMRS multiplexing/sharing with a sTTI length of 4 OFDM symbols. If the network node does not want to utilise DMRS multiplexing/sharing it can configure the pattern in FIG. 8 instead. The same applies for sTTI length of 2 symbols. If network node wants to operate using DMRS multiplexing/sharing, the pattern in FIG. 9(*a*) or FIG. 9(*b*) is configured. Otherwise the pattern in FIG. 9(*a*) or FIG. 9(*b*) without DMRS multiplexing/sharing is used.

Hence, according to an embodiment, for sTTI lengths of an OFDM symbol length of 3/4 and 2/3, configuration parameters for the network node to select between operation with DMRS multiplexing/sharing and operation without DMRS multiplexing/sharing are defined.

At least two parameters are needed to allow different sPUSCH patterns as illustrated in the above references FIGS. 6, 7, 8, 9, 14. The wireless device needs to know the sTTI length used for sPUSCH transmission and it needs to know the DMRS positions. These two parameters can in principle be configured separately. The TTI length for a given wireless device may not need to be changed as often as the DMRS configuration. The DMRS configuration needs to adapt to the number of active wireless devices, the type of these wireless devices (high MCS expected or not), their buffer status, etc. It should thus be sent on PDCCH or sPDCCH. The sTTI length for sPUSCH needs to be based on coverage aspects, i.e. as the wireless device goes more and more into a bad coverage area the network node would adapt by configuring a longer and longer sTTI length. RRC configuration of the sTTI length would be sufficient for this case. However, faster adaptation of the sTTI length has shown to be beneficial in case of TCP traffic to adapt the sTTI length according to an estimate of the approaching end of the TCP slowstart phase. This could require a faster signalling of the sPUSCH length over a wireless device-specific DCI sent on PDCCH or sPDCCH. In this case, a joint configuration of TTI length and DMRS position can be considered.

Uplink control information (UCI) comprises HARQ-ACK bits, CSI and scheduling request. In legacy operation, if the wireless device does not have a valid scheduling grant in current subframe, UCI is sent with PUCCH, and otherwise, UCI is always time multiplexed with the coded data onto the PUSCH. When introducing sTTI, how to send UCI needs to be considered.

When sPUCCH and sPUSCH have the same short TTI length, it is straight forward to follow the legacy rules to send UCI, i.e. if the wireless device does not have a valid scheduling grant in current subframe, UCI is sent with sPUCCH, otherwise, UCI is multiplexed with the coded data onto the sPUSCH. However, in case of different lengths of sPUCCH and sPUSCH, UCI sent on sPUCCH might collide with sPUSCH transmission (overlap within OFDM symbols). In this case, the network node should take into account the presence of HARQ-ACK when scheduling sPUSCH, so that the UCI is always sent on sPUSCH if there is a valid UL scheduling grant for the wireless device and if the scheduled sPUSCH is within the same slot as the sPUCCH.

Hence, according to an embodiment the UCI is always sent on sPUSCH if it overlaps with sPUCCH in time.

Frequent CSI feedback can be helpful for fast link adaptation. In legacy operation, this is enabled by periodic CSI feedback on PUCCH together with aperiodic CSI feedback. When introducing multiple sPDCCH in a single subframe, it is possible to retrieve more frequent aperiodic CSI feedback on sPUSCH. Therefore, it might be sufficient to only support aperiodic CSI reports for sTTI transmissions. Moreover, the resource elements allocated to a sPUSCH can be significantly larger than that of a sPUCCH, which makes it more suitable to transmit large payload CSI reports on sPUSCH.

Hence, according to an embodiment only aperiodic CSI reports on sPUSCH for sTTI transmissions are supported, in addition to existing CSI reports on PUCCH and PUSCH.

If legacy PUSCH and sPUSCH are transmitted from different wireless devices on the same resources, the sPUSCH can suffer from a large level of interference created by the legacy PUSCH transmission. The power allocated for PUSCH and sPUSCH might be significantly larger than the noise power. This interference might destroy the decoding for sPUSCH. For decoding PUSCH, the network node can either remove the data symbols that are overlapped with the sPUSCH transmission, or it can try to decode PUSCH by treating sPUSCH as interference. However, both of these approaches may result in a failure decoding of PUSCH. The herein disclosed embodiments would make it possible for the network node to perform such scheduling.

If a wireless device is scheduled for a sPUSCH transmission when legacy PUSCH transmission for the same wireless device has already been scheduled, and the resources allocated for sPUSCH is overlapped with that for legacy PUSCH, the wireless device can puncture the PUSCH by only transmitting sPUSCH on the overlapped resources. In this case, sPUSCH can be decoded by the network node. However, due to the puncturing, the PUSCH data symbols that are supposed to be transmitted on the overlapped resources are lost. Thus, the network node might not be able to decode legacy PUSCH. Another case is where the resources are not overlapping. The effect may however be similar particularly for shorter sTTI due to power control changes and correspondingly the PUSCH may not be possibility to decode in this case either.

Hence, according to an embodiment the wireless device is not expected to transmit legacy PUSCH and sPUSCH in the same subframe on one carrier. No specification support is needed for this case as it is seen as an error by the network node to schedule both at the same time.

The inventive concept has mainly been described above with reference to a few embodiments. However, as is readily appreciated by a person skilled in the art, other embodiments than the ones disclosed above are equally possible within the scope of the inventive concept, as defined by the appended claims.

The invention claimed is:

1. A method for providing configuration for uplink transmission to a wireless device, the method being performed by a network node, the method comprising:
transmitting a message to the wireless device, the message being a slow grant and comprising configuration for uplink transmission with short Transmission Time Interval, TTI, operation, the short TTI having duration within a 1 ms subframe, and the configuration specifying that all TTIs for short TTI operation are slot contained; and
transmitting a fast grant comprising scheduling of an uplink short TTI transmission for the wireless device, the fast grant defining the scheduling of the uplink short TTI transmission by relying upon information carried in a preceding slow grant;
wherein the slow grant is transmitted once per subframe or less frequently than once per subframe, and the fast grant is transmitted more frequently than once per subframe.

2. The method according to claim 1, wherein the uplink transmission, to which the configuration and the scheduling relate, is to be performed in a short TTI frequency band.

3. The method according to claim 1, further comprising:
receiving a data transmission from the wireless device on a Physical Uplink Shared Channel, PUSCH, for short TTI operation according to the fast grant.

4. A method for receiving configuration for uplink transmission from a network node, the method being performed by a wireless device, the method comprising:
receiving, from the network node, a message comprising configuration for uplink transmission with short Transmission Time Interval, TTI, operation, the short TTI having duration within a 1 ms subframe, the message being a slow grant, and the configuration specifying that all TTIs for short TTI operation are slot contained; and
receiving, from the network node, a fast grant comprising scheduling of an uplink short TTI transmission for the wireless device, the fast grant defining the scheduling of the uplink short TTI transmission by relying upon information carried in a preceding slow grant;
wherein the slow grant is transmitted once per subframe or less frequently than once per subframe, and the fast grant is transmitted more frequently than once per subframe.

5. The method according to claim 4, wherein the uplink transmission, to which the configuration and the scheduling relate, is to be performed in a short TTI frequency band.

6. The method according to claim 4, further comprising:
performing a data transmission on a Physical Uplink Shared Channel, PUSCH, for short TTI operation according to the fast grant.

7. The method according to claim 1, wherein the configuration defines positions of reference symbols and data symbols for short TTI operation.

8. The method according to claim 7, wherein the reference symbols are uplink demodulation reference signals, DMRS.

9. The method according to claim 7, wherein according to the configuration, the reference symbols are positioned at symbols 3 and 10 in each subframe.

10. The method according to claim 7, wherein according to the configuration, each TTI for short TTI operation comprises at most one reference symbol.

11. The method according to claim 7, wherein according to the configuration, the reference symbols are positioned either first or last in each TTI for short TTI operation that comprises a reference symbol.

12. The method according to claim 7, wherein according to the configuration, reference symbols for different TTI for short TTI operation are placed on a common symbol.

13. The method according to claim 7, wherein according to the configuration, all TTIs for short TTI operation are slot contained.

14. The method according to claim 1, wherein the configuration is signaled by a short TTI configuration index.

15. The method according to claim 1, wherein the configuration is signaled by a first parameter indicating length of the short TTI and a second parameter indicating positions of reference symbols and data symbols for short TTI operation.

16. The method according to claim 1, wherein the configuration further specifies a downlink TTI frequency band length.

17. The method according to claim 1, wherein the configuration is fixed for each subframe.

18. The method according to claim 1, wherein at least two TTIs for short TTI operation have mutually different lengths within one subframe.

19. The method according to claim 1, wherein at least two wireless devices for short TTI operation have mutually different lengths of TTI frequency bands within one subframe.

20. The method according to claim 1, wherein the message is a radio resource control message.

21. The method according to claim 12, wherein the fast grant is transmitted more frequently than the slow grant.

22. The method according to claim 1, wherein the fast grant is transmitted on a per symbol basis.

23. The method according to claim 1, wherein the fast grant is part of the message comprising said configuration.

24. The method according to claim 1, wherein the fast grant is part of a message being different from the message comprising said configuration.

25. A network node for providing configuration for uplink transmission to a wireless device, the network node comprising:
    processing circuitry; and
    a computer program product storing instructions that, when executed by the processing circuitry, causes the network node to:
        transmit a message to the wireless device, the message being a slow grant and comprising configuration for uplink transmission with short Transmission Time Interval, TTI, operation, the short TTI having duration within a 1 ms subframe, and the configuration specifying that all TTIs for short TTI operation are slot contained; and
        transmit a fast grant comprising scheduling of an uplink short TTI transmission for the wireless device, the fast grant defining the scheduling of the uplink short TTI transmission by relying upon information carried in a preceding slow grant;
        wherein the slow grant is transmitted once per subframe or less frequently than once per subframe, and the fast grant is transmitted more frequently than once per subframe.

26. A wireless device for receiving configuration for uplink transmission from a network node, the wireless device comprising:
    processing circuitry; and
    a computer program product storing instructions that, when executed by the processing circuitry, causes the wireless device to:
        receive, from the network node, a message comprising configuration for uplink transmission with short Transmission Time Interval, TTI, operation, the short TTI having duration within a 1 ms subframe, the message being a slow grant, and the configuration specifying that all TTIs for short TTI operation are slot contained; and
        receive, from the network node, a fast grant comprising scheduling of an uplink short TTI transmission for the wireless device, the fast grant defining the scheduling of the uplink short TTI transmission by relying upon information carried in a preceding slow grant;
        wherein the slow grant is transmitted once per subframe or less frequently than once per subframe, and the fast grant is transmitted more frequently than once per subframe.

27. A computer program for receiving configuration for uplink transmission from a network node, the computer program comprising computer code which, when run on processing circuitry of a wireless device, causes the wireless device to:
    receive, from the network node, a message comprising configuration for uplink transmission with short Transmission Time Interval, TTI, operation, the short TTI having duration within a 1 ms subframe, the message being a slow grant, and the configuration specifying that all TTIs for short TTI operation are slot contained; and
    receive, from the network node, a fast grant comprising scheduling of an uplink short TTI transmission for the wireless device, the fast grant defining the scheduling of the uplink short TTI transmission by relying upon information carried in a preceding slow grant;
    wherein the slow grant is transmitted once per subframe or less frequent than once per subframe, and the fast grant is transmitted more frequently than once per subframe.

* * * * *